United States Patent
Choi (10) Patent No.: US 10,378,664 B2
(45) Date of Patent: Aug. 13, 2019

(54) BIDET VALVE DEVICE

(71) Applicant: Gwang Min Choi, Uijeongbu-si, Gyeonggi-do (KR)

(72) Inventor: Won Sik Choi, Uijeongbu-si (KR)

(73) Assignee: Gwang Min Choi, Uijeongbu-si (KR)

( * ) Notice: Subject to any disclaimer, the term of this patent is extended or adjusted under 35 U.S.C. 154(b) by 0 days.

(21) Appl. No.: 15/772,806

(22) PCT Filed: Nov. 2, 2016

(86) PCT No.: PCT/KR2016/012496
§ 371 (c)(1),
(2) Date: May 1, 2018

(87) PCT Pub. No.: WO2017/078386
PCT Pub. Date: May 11, 2017

(65) Prior Publication Data
US 2018/0320793 A1    Nov. 8, 2018

(30) Foreign Application Priority Data
Nov. 2, 2015 (KR) .................. 10-2015-0153418

(51) Int. Cl.
*E03D 9/08* (2006.01)
*F16K 11/044* (2006.01)
*F16K 11/074* (2006.01)

(52) U.S. Cl.
CPC .............. *F16K 11/044* (2013.01); *E03D 9/08* (2013.01); *F16K 11/074* (2013.01)

(58) Field of Classification Search
CPC ......... E03D 9/08; E03D 9/085; F16K 11/044; F16K 11/074
USPC ............................................................ 4/443
See application file for complete search history.

(56) References Cited

U.S. PATENT DOCUMENTS

2011/0041243 A1\* 2/2011 Kwon ...................... E03D 9/08
4/443

FOREIGN PATENT DOCUMENTS

| KR | 10-0785514 B1 | 12/2007 |
| KR | 10-0804171 B1 | 2/2008 |
| KR | 10-0838999 B1 | 6/2008 |
| KR | 20-0444870 Y1 | 6/2009 |
| KR | 10-2009-0117512 A | 11/2009 |

\* cited by examiner

*Primary Examiner* — Tuan N Nguyen
(74) *Attorney, Agent, or Firm* — Maschoff Brennan (57) ABSTRACT

Disclosed is a bidet valve device, which sprays nozzle-washing water so as to automatically wash a nozzle before performing anal cleansing or feminine cleansing, when a lever is operated for anal cleansing or feminine cleansing, and automatically washes the nozzle even after anal cleansing or feminine cleansing so as to hygienically manage the nozzle and provide cleanliness to a user.

4 Claims, 5 Drawing Sheets

BIDET VALVE DEVICE

TECHNICAL FIELD

The present invention relates to a bidet valve device, and more particularly, to a bidet valve device capable of hygienically managing a nozzle and providing cleanliness to users by automatically spraying nozzle-washing water to clean the nozzle before posterior wash or feminine wash when a lever is operated for posterior wash or feminine wash and automatically cleaning the nozzle even after the posterior wash or feminine wash operation.

BACKGROUND ART

In general, a bidet is a device having a function to automatically spray cleansing water to clean a corresponding body part without toilet paper when a user operates the bidet after using the toilet.

Bidets are usually divided into electric and non-electric bidets. In basic operation, bidets are used for posterior wash, in which the anus is cleansed using the cleansing water sprayed through the nozzle without toilet paper after use of the toilet, and feminine wash, in which the genital area of a woman is cleansed. The posterior wash operation and the feminine wash operation are selectively performed through a valve device.

Examples of the valve device used in bidets are disclosed in Korean Patent Nos. 10-0785514, 10-0838999, and 10-0804171.

However, the conventional bidet valve devices disclosed in the aforementioned patent documents fail to provide confidence in cleanliness and hygiene for users as they do not have a function to automatically clean the nozzle when the nozzle is operated for posterior wash or feminine wash.

PRIOR ART LITERATURE

Patent Documents

1) Korea Patent No. 10-0785514 (issued on Dec. 6, 2007), Title of Invention: "FLOW CHANNEL CHANGE VALVE DEVICE FOR BIDET"
2) Korea Patent No. 10-0838999 (issued on Jun. 11, 2008), Title of Invention: "FLOW PATH CONTROL VALVE OF A BIDET, AND A BIDET INCLUDING THE SAME"
3) Korean Utility Model No. 20-0444870 (issued on Jun. 5, 2009), Title of Invention: "Device for Controlling Water Course of Control Value in Bidet"
4) Korea Patent No. 10-0804171 (issued on Feb. 11, 2008), Title of Invention: "Bidet Comprising a Valve for Measuring Flow Rate"

DISCLOSURE

Technical Problem

Therefore, the present invention has been made in view of the above problems, and it is one object of the present invention to provide a bidet valve device for providing cleanliness to users by causing nozzle-washing water to be sprayed to automatically to clean the nozzle before posterior wash or feminine wash when a lever is operated for posterior wash or feminine wash.

Technical Solution

The object of the present invention can be achieved by providing a bidet valve device installed on a part of a bidet to supply cleansing water into a feminine wash nozzle or a posterior wash nozzle, the bidet valve device including an upper case having a supply tube connection port formed on a side surface thereof to communicate with an interior of the upper case and a lever exposing hole formed in a top portion of the upper case in a penetrating manner; a cleansing water supply tube coupled to the supply tube connection port in a fitting manner to supply the cleansing water; a rotary plate adjusting member connected to the upper case so as to be inserted into the upper case such that a space is formed between an outer surface of the rotary plate adjusting member and an inner surface of the cleansing water supply tube, the rotary plate adjusting member having a lever connection hole formed in a top portion thereof so as to be exposed to an upper side through the lever exposing hole; a water channel selection rotary plate disposed in close contact with a lower surface of the rotary plate adjusting member so as to rotate together with the rotary plate adjusting member when the rotary plate adjusting member is rotated, the water channel selection rotary plate comprising a central flow channel formed at a center of an upper surface thereof, a wall arranged along an edge of the central flow channel to closely contact the rotary plate adjusting member, and a first hole and a second hole arranged in series and formed in a bottom of the water channel selection rotary plate so as to penetrate the water channel selection rotary plate downward, wherein the wall is provided with a water inflow channel at a plurality of parts thereof so as to communicate with an outside to guide the cleansing water into the central flow channel through the water inflow channel; a blocking plate disposed in close contact with a lower surface of the water channel selection rotary plate and fixedly arranged inside the upper case, the blocking plate being provided with a nozzle cleaning hole formed on left and right sides of the first hole so as to penetrate the blocking plate downward such that the first hole is aligned with the nozzle cleaning hole to allow the cleansing water to be discharged through the nozzle cleaning hole when the water channel selection rotary plate is partially rotated leftward and rightward, and a feminine wash hole and a posterior wash hole formed on left and right sides of the second hole, respectively, so as to penetrate the blocking plate downward such that the second hole is aligned with the feminine wash hole or the posterior wash hole to allow the cleansing water to be discharged through the feminine wash hole or the posterior wash hole when the water channel selection rotary plate is further rotated leftward and rightward; a packing disposed in close contact with a lower surface of the blocking plate and provided with a nozzle cleaning communication hole corresponding to the nozzle cleaning hole, a feminine wash communication hole corresponding to the feminine wash hole, and a posterior wash communication hole corresponding to the posterior wash hole, wherein the nozzle cleaning communication hole, the feminine wash communication hole and the posterior wash communication hole are formed in a penetrating manner; a lower case disposed in close contact with a lower surface of the packing and fixedly installed at the upper case, the lower case being provided, at a center thereof, with a nozzle cleaning water channel hole corresponding to the nozzle cleaning communication hole, a feminine wash water channel hole corresponding to the feminine wash communication hole, and a posterior wash water channel hole corresponding to the posterior wash communication hole, and provided, on one side of a lower portion thereof, with a nozzle cleaning discharge tube connection port communicating with the nozzle cleaning water channel hole, a feminine wash discharge tube connection port communicating with the feminine wash water channel hole, and a posterior wash discharge tube connection port communicating with the posterior wash water channel hole; a nozzle cleaning discharge tube coupled to the nozzle cleaning discharge tube connection port in a fitting manner to supply the cleansing water to an outer surface of the feminine wash nozzle or the posterior wash nozzle to clean the feminine wash nozzle or the posterior wash nozzle when the cleansing water is guided therethrough; a feminine wash discharge tube coupled to the feminine wash discharge tube connection port in a fitting manner to supply the cleansing water into the feminine wash nozzle so as to perform feminine wash when the cleansing water is guided therethrough; and an posterior wash discharge tube coupled to the posterior wash discharge tube connection port in a fitting manner to supply the cleansing water into the posterior wash nozzle so as to perform posterior wash when the cleansing water is guided therethrough, wherein, during an operation of rotating the rotary plate adjusting member to a feminine wash position to perform the feminine wash, the first hole is aligned with the nozzle cleaning hole and the cleansing water is supplied to the outer surface of the feminine wash nozzle to clean the feminine wash nozzle, before the second hole is aligned with the feminine wash hole, wherein, during an operation of rotating the rotary plate adjusting member to a posterior wash position to perform the posterior wash, the first hole is aligned with the nozzle cleaning hole and the cleansing water is supplied to the outer surface of the posterior wash nozzle to clean the posterior wash nozzle, before the second hole is aligned with the posterior wash hole.

In addition, a lower portion of the rotary plate adjusting member is provided with an engagement protrusion protruding therefrom, and the water channel selection rotary plate is provided with an engagement groove corresponding to the engagement protrusion, wherein the engagement protrusion is coupled to the engagement groove in a fitting manner such that the water channel selection rotary plate is rotated together with the rotary plate adjusting member when the rotary plate adjusting member is rotated.

In addition, the feminine wash hole or the posterior wash hole is formed to have an arc shape having a diameter increasing from a front portion to a rear portion thereof, such that, when the second hole is aligned with the feminine wash hole or the posterior wash hole by rotation of the water channel selection rotary plate to discharge cleansing water, an amount of the cleansing water is adjusted in a manner that a minimum amount of the cleansing water is discharged at a position where alignment between the second hole and the feminine wash hole or the posterior wash hole begins, and a maximum amount of the cleansing water is discharged at a position where alignment between the second hole and the feminine wash hole or the posterior wash hole ends, wherein the first hole is configured to have a larger diameter than the nozzle cleaning hole to ensure that the cleansing water guided into the first hole is discharged into the nozzle cleaning hole.

Advantageous Effects

With the bidet valve device according to the present invention, when a lever is operated for posterior wash or feminine wash, water for cleaning the nozzle is sprayed first to automatically clean the nozzle, and the nozzle is automatically cleaned even after the posterior wash or feminine wash operation. Therefore, the bidet valve device can hygienically manage the nozzle and provide confidence in hygiene and cleanliness for users, thereby improving product reliability.

BEST MODE

Hereinafter, the present invention will be described in detail with reference to the accompanying drawings.

Referring to FIGS. 1 to 4, a bidet valve device according to the present invention is installed in a part of a bidet (not shown) to selectively supply cleansing water to a feminine wash nozzle (not shown) or a posterior wash nozzle (not shown). Thereby, the bidet valve device is configured to perform a feminine wash operation, a posterior wash operation, and an operation of washing the feminine wash nozzle and the posterior wash nozzle. Here, the bidet is applicable to both the electric bidet and the non-electric bidet, and thus is not necessarily limited to a specific model.

The bidet valve device according to the present invention includes an upper case 100, a rotary plate adjusting member 300, a water channel selection rotary plate 400, a blocking plate 500, a packing 600, and a lower case 700.

First, the upper case 100 has a hollow inside and a supply tube connection port 110 is formed on one side thereof so as to communicate with the inside of the upper case 100. A lever exposing hole 120 is formed in a top portion of the upper case in a penetrating manner. In addition, a plurality of flange portions 130 provided with fixing holes 132 in a penetrating manner so as to be screwed to a part of the bidet protrudes from the outer surface of the upper case. In addition, a cleansing water supply tube 200 is fitted into the supply tube connection port 110 of the upper case 100 such that cleansing water is supplied into the upper case 100 through the cleansing water supply tube 200.

Next, the rotary plate adjusting member 300 is connected to the upper case 100 so to be inserted into the upper case. When the rotary plate adjusting member 300 is connected, a space G through which the cleansing water can flow is formed between the outer surface of the rotary plate adjusting member 300 and the inner surface of the cleansing water supply tube 200. A lever connection port 310, which is exposed to the upper side through the lever exposing hole 120, is integrally formed at the top portion of the rotary plate adjusting member 300. Here, a lever (not shown) is coupled to the lever connection port 310 such that the user can grip the lever and rotate the rotary plate adjusting member 300 left and right. A plurality of engagement protrusions 320 protrudes from a lower portion of the rotary plate adjusting member 300.

Next, the water channel selection rotary plate 400 is disposed in close contact with the lower surface of the rotary plate adjusting member 300, and is provided with an engagement groove 440 corresponding to the engagement protrusions 320 of the rotary plate adjusting member 300 at the edge thereof. Thus, when the engagement protrusions 320 are engaged with the engagement groove 440 in a fitting manner and the rotary plate adjusting member 300 is rotated, the water channel selection rotary plate 400 is rotated thereby. A central flow channel 410 is formed at the center of the upper surface of the water channel selection rotary plate 400 and a wall 420 to closely contact the rotary plate adjusting member 300 is formed along the edge of the central flow channel 410. A water inflow channel 430 is formed at multiple parts of the wall 420 so as to communicate with the outside. Thus, cleansing water is guided to the central flow channel 410 through the water inflow channel 430. In addition, a first hole 450 and a second hole 460 are formed in the bottom of the water channel selection rotary plate 400 so as to penetrate the water channel selection rotary plate downward. Here, the first hole 450 and the second hole 460 are preferably arranged one after the other in the same line oriented toward the center of the water channel selection rotary plate 400, or may be arranged misaligned.

Next, the blocking plate 500 is disposed in close contact with the lower surface of the water channel selection rotary plate 400, and is fixedly installed so as not to rotate inside the upper case 100. Specifically, an anti-rotation protrusion 540 protrudes from a part of the outer surface of the blocking plate 500 and a fixing groove 150 into which the anti-rotation protrusion 540 is inserted is formed inside the upper case 100. Thus, when the blocking plate 500 is fitted into the upper case 100, the anti-rotation protrusion 540 is inserted into the fixing groove 150 to prevent the blocking plate 500 from rotating. In addition, a nozzle cleaning hole 510 is formed in the blocking plate 500 on the left and right sides of the first hole 450 so as to penetrate the blocking plate downward, such that, when the water channel selection rotary plate 400 is partially rotated leftward and rightward, the first hole 450 is aligned with the nozzle cleaning hole 510 to allow the cleansing water to be discharged through the nozzle cleaning hole 510. In addition, a feminine wash hole 520 and a posterior wash hole 530 are formed on the left side and right side of the second hole 460, respectively, so as to penetrate the blocking plate downward such that, when the water channel selection rotary plate 400 is further rotated leftward and rightward, the second hole 460 is aligned with the feminine wash hole 520 or the posterior wash hole 530 to allow the cleansing water to be discharged through the feminine wash hole 520 or the posterior wash hole 530.

Next, the packing 600 is made of a rubber material and disposed in close contact with the lower surface of the blocking plate 500 so as to be interposed between the blocking plate and the lower case 700, which will be described later, thereby preventing the cleansing water from leaking into the clearance in the assembly of the upper case 100 and the lower case 700. In the center of the packing 600, a nozzle cleaning communication hole 610 corresponding to the nozzle cleaning hole 510, a feminine wash communication hole 620 corresponding to the feminine wash hole 520, and a posterior wash communication hole 630 corresponding to the posterior wash hole 530 are formed in a penetrating manner.

Next, the lower case 700 is fixed to the upper case 100 while closely contacting the lower surface of the packing 600. Specifically, multiple fastening pieces 770 having a fastening hole 772 formed therein in a penetrating manner protrude from the outer surface of the lower case 700, and a fastening boss 140 to closely contact the fastening pieces 770 protrudes downward from a part of the bottom surface of the flange 130 of the upper case. Thus, with the lower case 700 and the upper case 100 coupled to each other, a screw S coupled through the fastening hole 772 is fixedly coupled to the fastening boss 140 by being fastened to the fastening boss 140 in a burrowing manner. In addition, a nozzle cleaning water channel hole 710 corresponding to the nozzle cleaning communication hole 610, a feminine wash water channel hole 720 corresponding to the feminine wash communication hole 620, and a posterior wash water channel hole 730 corresponding to the posterior wash communication hole 630 are formed at the center of the lower case 700. A nozzle cleaning discharge tube connection port 740 communicating with the nozzle cleaning water channel hole 710, a feminine wash discharge tube connection port 750 communicating with the feminine wash water channel hole 720, and a posterior wash discharge tube connection port 760 communicating with the posterior wash water channel hole 730 are integrally formed on one side of the lower portion of the lower case.

Next, a nozzle cleaning discharge tube 800 is coupled to the nozzle cleaning discharge tube connection port 740 in a fitting manner. Thus, when the cleansing water is guided therethrough, the cleansing water may be supplied to the outer surface of the feminine wash nozzle or the posterior wash nozzle to clean the feminine wash nozzle or the posterior wash nozzle. A feminine wash discharge tube 810 is coupled to the feminine wash discharge tube connection port 750 in a fitting manner. Thus, when the cleansing water is guided therethrough, the cleansing water may be supplied into the feminine wash nozzle to perform the feminine wash operation. a posterior wash discharge tube 820 is coupled to the posterior wash discharge tube connection port 760 in a fitting manner. Thus, when the cleansing water is guided therethrough, the cleansing water may be supplied into the posterior wash nozzle to perform the posterior wash operation. Here, since performing the feminine wash operation or the posterior wash operation by guiding the cleansing water into the feminine wash nozzle or the posterior wash nozzle is a well-known technique, a description of the structure and operation of the feminine wash nozzle or the posterior wash nozzle will be omitted. That is, for the feminine wash nozzle or the posterior wash nozzle used in the present invention, a known product can be applied. However, the structure for cleaning the feminine wash nozzle or the posterior wash nozzle by supplying cleaning water to the outer surface of the feminine wash nozzle or the posterior wash nozzle through the nozzle cleaning discharge tube 800 is a unique feature of the present invention.

Next, according to the present invention, the feminine wash hole 520 or the posterior wash hole 530 is preferably formed to have an arc shape having a diameter increasing from the front portion to the rear portion thereof, such that, when the second hole 460 is aligned with the feminine wash hole 520 or the posterior wash hole 530 by rotation of the water channel selection rotary plate 400 to discharge cleansing water, the amount of cleansing water for feminine wash or posterior wash is adjusted in a manner that a minimum amount of cleansing water is discharged at a position where alignment between the second hole 460 and the feminine wash hole 520 or the posterior wash hole 530 begins, and a maximum amount of cleansing water is discharged at a position where alignment between the second hole 460 and the feminine wash hole 520 or the posterior wash hole 530 ends. In addition, the first hole 450 is preferably configured to have a larger diameter than the nozzle cleaning hole 510 or to have a long groove to ensure that the cleansing water guided into the first hole 450 is discharged into the nozzle cleaning hole 510. In addition, although not shown, an engagement structure may be separately formed to allow the user to accurately sense the center position between the feminine wash position and the posterior wash position and the nozzle cleaning position when the user rotates the rotary plate adjusting member 300.

Now, assembly and operation of the bidet valve device according to the present invention configured as described above will be described.

When the bidet valve device according to the present invention is assembled, the rotary plate adjusting member 300, the water channel selection rotary plate 400 and the blocking plate 500 are sequentially inserted into the upper case 100, and then the lower case 700 is connected to the upper case with the packing 600 bought into contact with the lower portion of the blocking plate 500. Then, the screw S penetrating the fastening hole 772 is fixedly fastened to the fastening boss 140. Then, the cleansing water supply tube 200 is connected to the supply tube connection port 110 of the upper case 100, and each of the nozzle cleaning discharge tube 800, the feminine wash discharge tube 810, and the posterior wash discharge tube 820 is connected to a corresponding one of the nozzle cleaning discharge tube connection port 740, the feminine wash discharge tube connection port 750 and the posterior wash discharge tube connection port 760 of the lower case 700. Of course, the valve device assembled in this way is installed on a part of the bidet, and then fixed to the bidet through the fixing hole 132 formed in the flange 130 of the upper case 100. The nozzle cleaning discharge tube 800 is installed so as to guide the cleansing water to the outer surfaces of the feminine wash nozzle and the posterior wash nozzle, and the feminine wash discharge tube 810 is installed so as to guide the cleansing water into the feminine wash nozzle. The posterior wash discharge tube 820 is installed so as to guide the cleansing water into the posterior wash nozzle.

When the bidet valve device assembled in this way is operated, the water channel selection rotary plate 400 can be rotated together with the rotary plate adjusting member 300 to the feminine wash position or the posterior wash position through the valve as desired by the user. Then, the bidet valve device according to the present invention automatically performs an operation of cleaning the feminine wash nozzle or the posterior wash nozzle before and after the feminine wash operation or the posterior wash operation.

Figure 1:
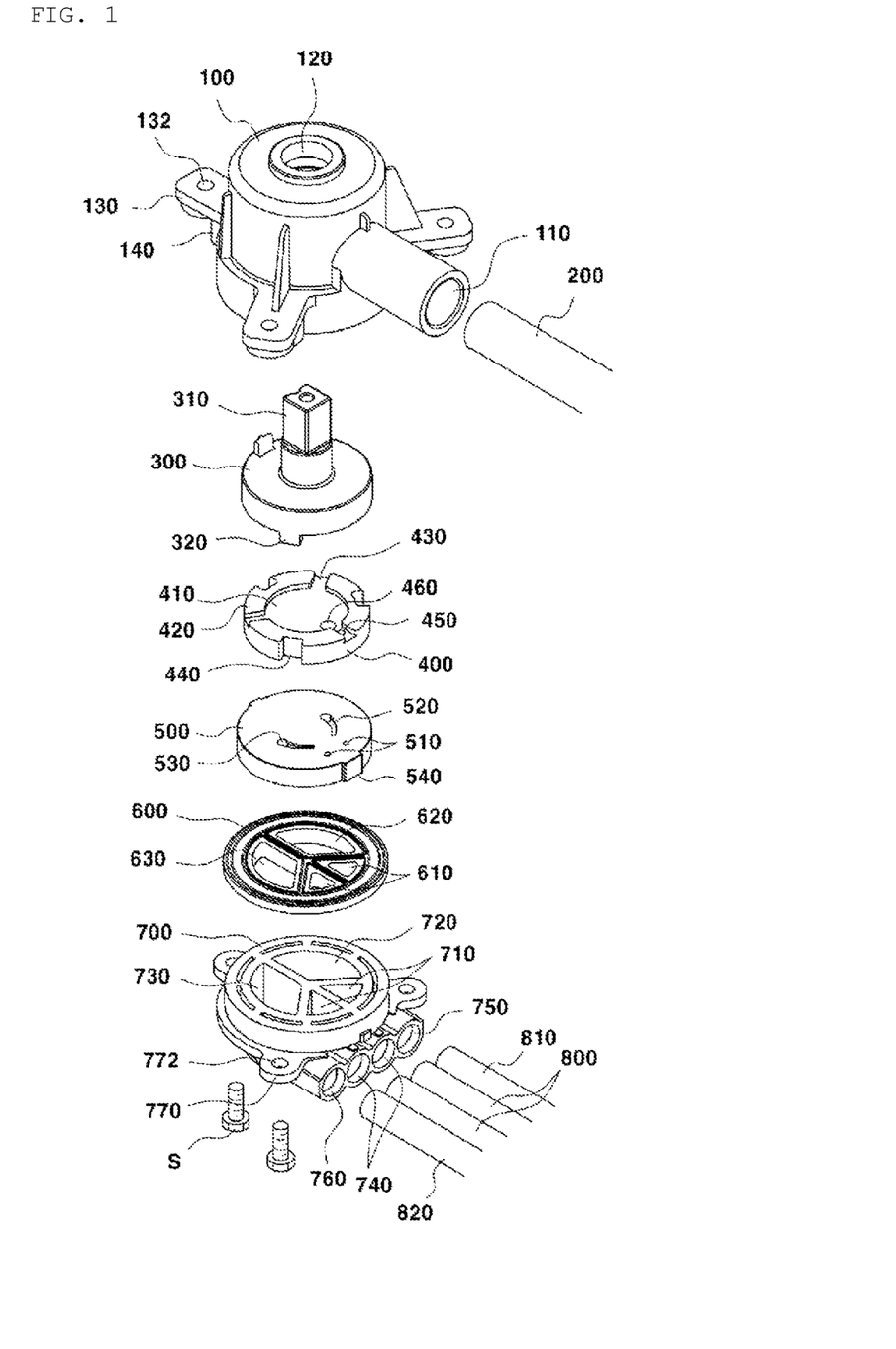
FIG. 1 is an exploded perspective view showing the configuration of a bidet valve device according to the present invention.
Figure 2:
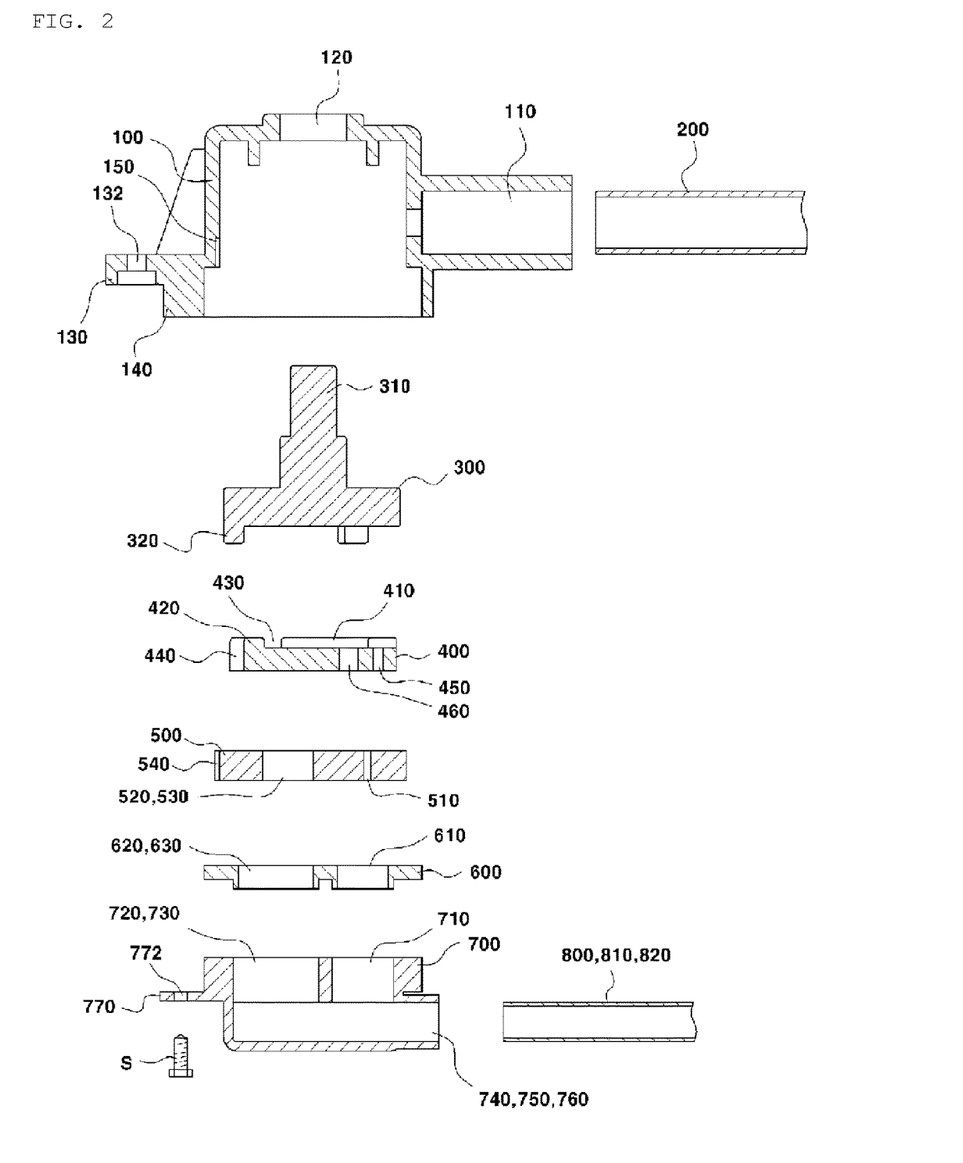
FIG. 2 is an exploded cross-sectional view showing the configuration of a bidet valve device according to the present invention.
Figure 3:
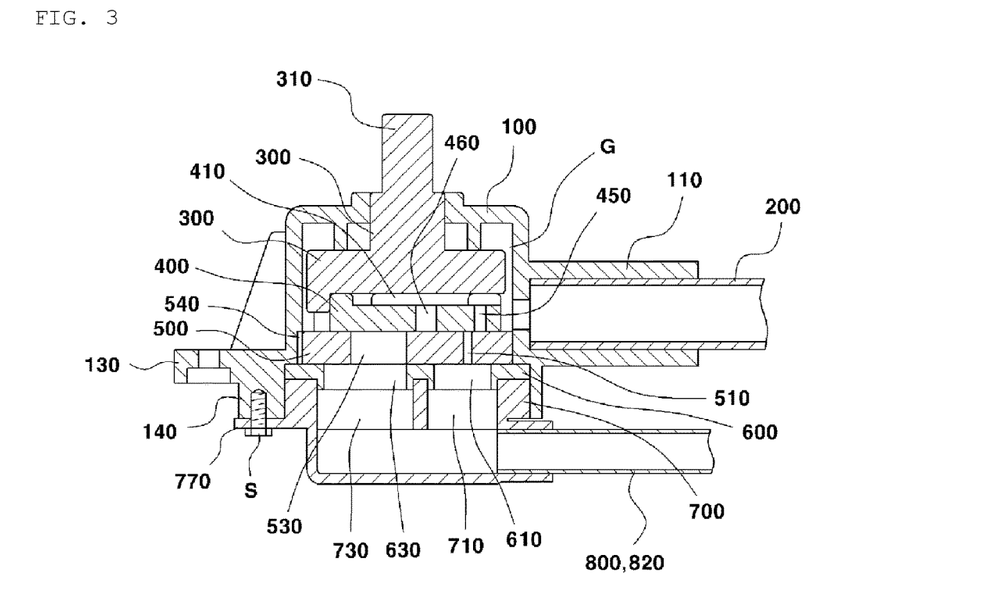
FIG. 3 is a cross-sectional view showing a bidet valve device according to the present invention which is an assembled state before operating.
Figure 4:
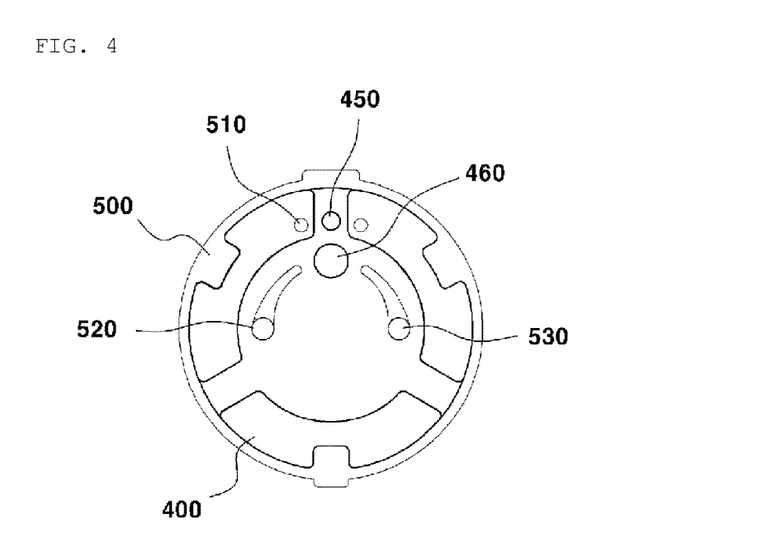
FIG. 4 is a plan view showing the positions of a water channel selection rotary plate and a blocking plate in FIG. 3.
Figure 5:
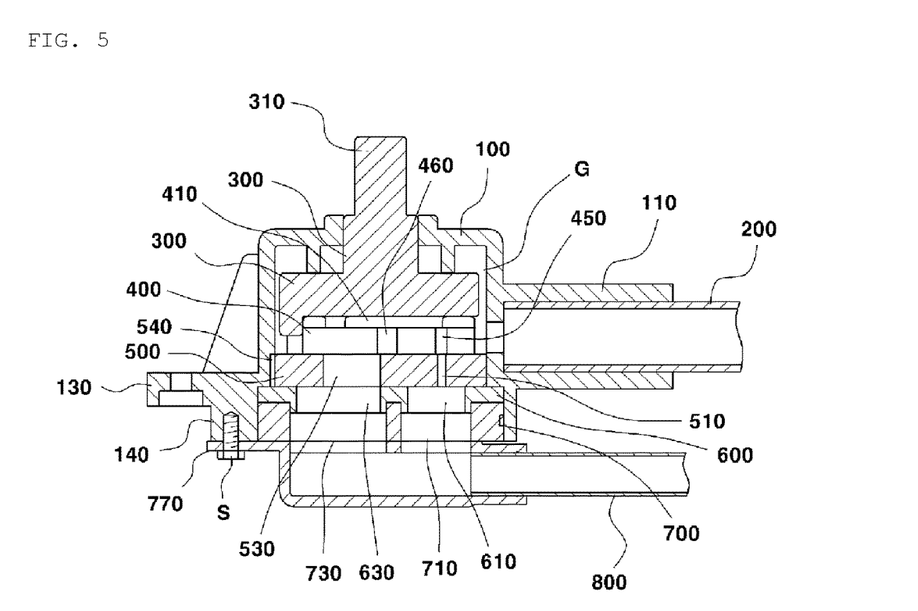
FIG. 5 is a cross-sectional view illustrating a nozzle washing mode set while the valve is operating to perform posterior wash in FIG. 3.
Figure 6:
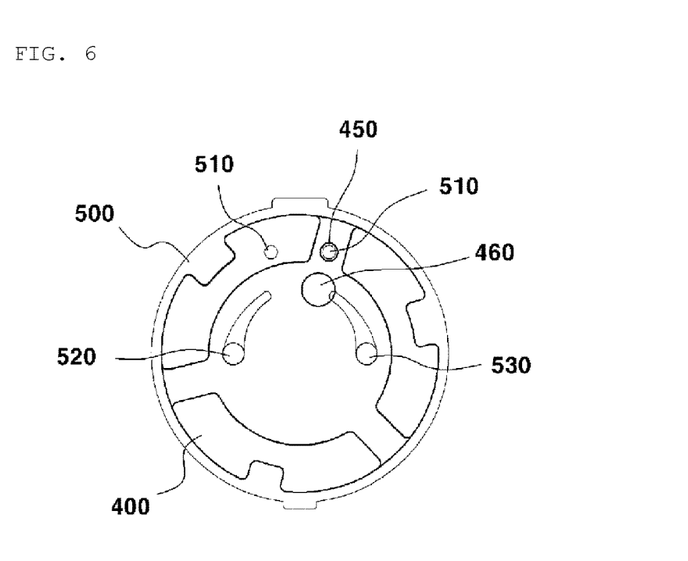
FIG. 6 is a plan view showing the positions of the water channel selection rotary plate and the blocking plate in the mode of FIG. 5.
Figure 7:
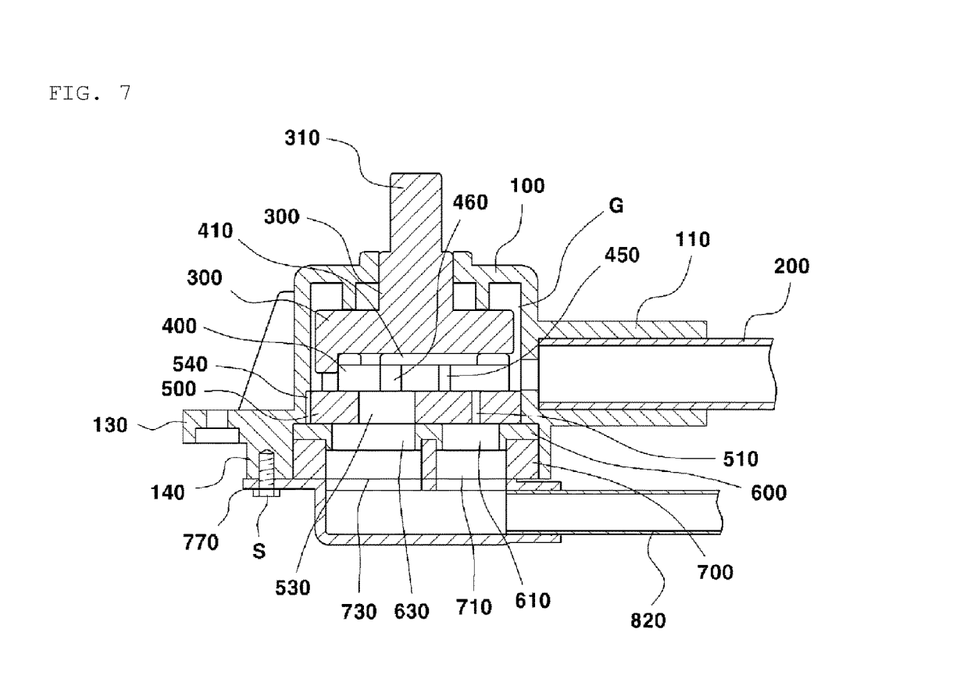
FIG. 7 is a cross-sectional view showing a posterior wash mode set by operation of the valve in FIG. 3.
Figure 8:
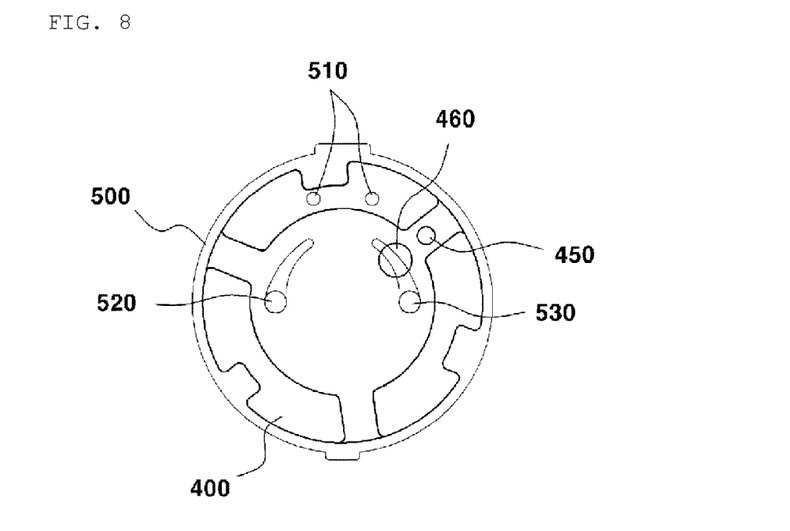
FIG. 8 is a plan view showing the positions of the water channel selection rotary plate and the blocking plate in the mode of FIG. 7.

For example, as shown in FIGS. 3 and 4, in operating the valve device to perform posterior wash, when the rotary plate adjusting member 300 positioned between the feminine wash position and the posterior wash position is rotated to the posterior wash position to perform posterior wash, the water channel selection rotary plate 400 is rotated together with the rotary plate adjusting member 300. Then, as shown in FIGS. 5 and 6, the cleansing water is supplied into the nozzle cleaning hole 510 as the first hole 450 is aligned with the nozzle cleaning hole 510. At this time, a part of the second hole 460 is aligned with the front portion of the posterior wash hole 530, and the cleansing water is supplied into the posterior wash nozzle. Then, the posterior wash nozzle is extended and exposed to the outside by the pressure of the cleansing water. Accordingly, the cleansing water supplied through the nozzle cleaning hole 510 with the posterior wash nozzle extended is guided to the outer surface of the posterior wash nozzle, thereby cleaning the posterior wash nozzle. When the rotary plate adjusting member 300 is further rotated after the posterior wash nozzle is cleaned, the first hole 450 passes by the nozzle cleaning hole 510 as shown in FIGS. 7 and 8. Thus, the cleansing water is blocked from being supplied into the nozzle cleaning hole 510. The cleansing water may be guided only into the posterior wash nozzle through the second hole 460 and the posterior wash hole 530 to perform the posterior wash operation. Of course, since the posterior wash hole 530 has an arc shape having a diameter increasing from the front portion to the rear portion thereof, the pressure of the cleansing water is adjusted depending on the position where the second hole 460 is placed in the posterior wash hole 530. Accordingly, the cleansing water can be used as desired by the user. When the rotary plate adjusting member 300 is returned to the original center position after posterior wash is completed, the operation of cleaning the posterior wash nozzle is performed at the position where the first hole 450 is aligned with the nozzle cleaning hole 510. Therefore, the posterior wash nozzle can be kept clean at all times.

When the rotary plate adjusting member 300 is rotated to the feminine wash position to perform feminine wash, operations are performed in the same order as the posterior wash described above. Since the only difference is that feminine wash is performed in place of posterior wash, redundant description will be omitted.

As described above, for the bidet valve device according to the present invention, during the operation of rotating the rotary plate adjusting member 300 to the feminine wash position to perform feminine wash, the first hole 450 is aligned with the nozzle cleaning hole 510 and the cleansing water is supplied to the outer surface of the feminine wash nozzle to clean the feminine wash nozzle, before the second hole 460 is aligned with the feminine wash hole 520. During the operation of rotating the rotary plate adjusting member 300 to the posterior wash position to perform posterior wash, the first hole 450 is aligned with the nozzle cleaning hole 510 and the cleansing water is supplied to the outer surface of the posterior wash nozzle to clean the posterior wash nozzle, before the second hole 460 is aligned with the posterior wash hole 530. The operation of cleaning the feminine wash nozzle and the posterior wash nozzle is also performed even when the rotary plate adjusting member is returned to the original position after the feminine wash and the posterior wash are finished. Therefore, feminine wash and posterior wash can be hygienically performed for the user at all times.

While the invention has been shown and described in relation to specific embodiments thereof, it will be understood by those skilled in the art that various changes and modifications can be made without departing from the spirit and scope of the invention as defined by the appended claims.

INDUSTRIAL APPLICABILITY

When the present invention is installed on a part of the bidet, and the lever is operated, water for washing the nozzle is sprayed to automatically clean the nozzle before posterior wash or feminine wash is performed. Therefore, cleanliness may be provided to the user.

The invention claimed is:

1. A bidet valve device installed on a part of a bidet to supply cleansing water into a feminine wash nozzle or a posterior wash nozzle, the bidet valve device comprising:
an upper case having a supply tube connection port formed on a side surface thereof to communicate with an interior of the upper case and a lever exposing hole formed in a top portion of the upper case in a penetrating manner;
a cleansing water supply tube coupled to the supply tube connection port in a fitting manner to supply the cleansing water;
a rotary plate adjusting member connected to the upper case so as to be inserted into the upper case such that a space is formed between an outer surface of the rotary plate adjusting member and an inner surface of the cleansing water supply tube, the rotary plate adjusting member having a lever connection hole formed in a top portion thereof so as to be exposed to an upper side through the lever exposing hole;
a water channel selection rotary plate disposed in close contact with a lower surface of the rotary plate adjusting member so as to rotate together with the rotary plate adjusting member when the rotary plate adjusting member is rotated, the water channel selection rotary plate comprising a central flow channel formed at a center of an upper surface thereof, a wall arranged along an edge of the central flow channel to closely contact the rotary plate adjusting member, and a first hole and a second hole arranged in series and formed in a bottom of the water channel selection rotary plate so as to penetrate the water channel selection rotary plate downward, wherein the wall is provided with a water inflow channel at a plurality of parts thereof so as to communicate with an outside to guide the cleansing water into the central flow channel through the water inflow channel;
a blocking plate disposed in close contact with a lower surface of the water channel selection rotary plate and fixedly arranged inside the upper case, the blocking plate being provided with a nozzle cleaning hole formed on left and right sides of the first hole so as to penetrate the blocking plate downward such that the first hole is aligned with the nozzle cleaning hole to allow the cleansing water to be discharged through the nozzle cleaning hole when the water channel selection rotary plate is partially rotated leftward and rightward, and a feminine wash hole and a posterior wash hole formed on left and right sides of the second hole, respectively, so as to penetrate the blocking plate downward such that the second hole is aligned with the feminine wash hole or the posterior wash hole to allow the cleansing water to be discharged through the feminine wash hole or the posterior wash hole when the water channel selection rotary plate is further rotated leftward and rightward;
a packing disposed in close contact with a lower surface of the blocking plate and provided with a nozzle cleaning communication hole corresponding to the nozzle cleaning hole, a feminine wash communication hole corresponding to the feminine wash hole, and a posterior wash communication hole corresponding to the posterior wash hole, wherein the nozzle cleaning communication hole, the feminine wash communication hole and the posterior wash communication hole are formed in a penetrating manner;
a lower case disposed in close contact with a lower surface of the packing and fixedly installed at the upper case, the lower case being provided, at a center thereof, with a nozzle cleaning water channel hole corresponding to the nozzle cleaning communication hole, a feminine wash water channel hole corresponding to the feminine wash communication hole, and a posterior wash water channel hole corresponding to the posterior wash communication hole, and provided, on one side of a lower portion thereof, with a nozzle cleaning discharge tube connection port communicating with the nozzle cleaning water channel hole, a feminine wash discharge tube connection port communicating with the feminine wash water channel hole, and a posterior wash discharge tube connection port communicating with the posterior wash water channel hole;
a nozzle cleaning discharge tube coupled to the nozzle cleaning discharge tube connection port in a fitting manner to supply the cleansing water to an outer surface of the feminine wash nozzle or the posterior wash nozzle to clean the feminine wash nozzle or the posterior wash nozzle when the cleansing water is guided therethrough;
a feminine wash discharge tube coupled to the feminine wash discharge tube connection port in a fitting manner to supply the cleansing water into the feminine wash nozzle so as to perform feminine wash when the cleansing water is guided therethrough; and
an posterior wash discharge tube coupled to the posterior wash discharge tube connection port in a fitting manner to supply the cleansing water into the posterior wash nozzle so as to perform posterior wash when the cleansing water is guided therethrough,
wherein, during an operation of rotating the rotary plate adjusting member to a feminine wash position to perform the feminine wash, the first hole is aligned with the nozzle cleaning hole and the cleansing water is supplied to the outer surface of the feminine wash nozzle to clean the feminine wash nozzle first, before the second hole is aligned with the feminine wash hole,
wherein, during an operation of rotating the rotary plate adjusting member to a posterior wash position to perform the posterior wash, the first hole is aligned with the nozzle cleaning hole and the cleansing water is supplied to the outer surface of the posterior wash nozzle to clean the posterior wash nozzle first, before the second hole is aligned with the posterior wash hole.

2. The bidet valve device according to claim 1, wherein a lower portion of the rotary plate adjusting member is provided with an engagement protrusion protruding therefrom, and the water channel selection rotary plate is provided with an engagement groove corresponding to the engagement protrusion,
wherein the engagement protrusion is coupled to the engagement groove in a fitting manner such that the water channel selection rotary plate is rotated together with the rotary plate adjusting member when the rotary plate adjusting member is rotated.

3. The bidet valve device according to claim 1, wherein the feminine wash hole or the posterior wash hole is formed to have an arc shape having a diameter increasing from a front portion to a rear portion thereof, such that, when the second hole is aligned with the feminine wash hole or the posterior wash hole by rotation of the water channel selection rotary plate to discharge cleansing water, an amount of the cleansing water is adjusted in a manner that a minimum amount of the cleansing water is discharged at a position where alignment between the second hole and the feminine wash hole or the posterior wash hole begins, and a maximum amount of the cleansing water is discharged at a position where alignment between the second hole and the feminine wash hole or the posterior wash hole ends, wherein the first hole is configured to have a larger diameter than the nozzle cleaning hole to ensure that the cleansing water guided into the first hole is discharged into the nozzle cleaning hole.

4. A bidet valve device installed on a part of a bidet to enable feminine wash or posterior wash by supplying cleansing water into a feminine wash nozzle by guiding the cleansing water to a feminine wash discharge tube through a second hole of a water channel selection rotary plate and a feminine wash hole of a blocking plate when a rotary plate adjusting member is rotated leftward to a feminine wash position or by supplying the cleansing water into a posterior wash nozzle by guiding the cleansing water into a posterior wash discharge tube through the second hole of the water channel selection rotary plate and a posterior wash hole of the blocking plate when the rotary plate adjusting member is rotated rightward to a posterior wash position, wherein a first hole is formed in front of the second hole of the water channel selection rotary plate, and the blocking plate is provided with a nozzle cleaning hole formed on left and right sides of the first hole, wherein, when the water channel selection rotary plate is rotated to the feminine wash position or the posterior wash position, the first hole and the nozzle cleaning hole are aligned with each other first so as to communicate with each other, such that the cleansing water is supplied to an outer surface of the feminine wash nozzle or the posterior wash nozzle to clean the feminine wash nozzle or the posterior wash nozzle first.

* * * * *